United States Patent
Buckley et al.

(10) Patent No.: US 9,964,421 B1
(45) Date of Patent: May 8, 2018

(54) FLUID FLOW RATE MEASURING DEVICE

(71) Applicants: Jim Buckley, Commerce City, CO (US); Kieran L. Donohue, River Hills, WI (US)

(72) Inventors: Jim Buckley, Commerce City, CO (US); Kieran L. Donohue, River Hills, WI (US)

(73) Assignee: Kieran L. Donohue, River Hills, WI (US)

( * ) Notice: Subject to any disclaimer, the term of this patent is extended or adjusted under 35 U.S.C. 154(b) by 0 days. days.

(21) Appl. No.: 15/481,062

(22) Filed: Apr. 6, 2017

Related U.S. Application Data

(60) Provisional application No. 62/319,319, filed on Apr. 7, 2016.

(51) Int. Cl.
*G01F 1/34* (2006.01)

(52) U.S. Cl.
CPC .................................. *G01F 1/34* (2013.01)

(58) Field of Classification Search
CPC .......................................................... G01F 1/34
See application file for complete search history.

(56) References Cited

U.S. PATENT DOCUMENTS

| | | | |
|---|---|---|---|
| 2,510,986 A * | 6/1950 | Larkin | G01P 5/165 165/134.1 |
| 6,055,869 A | 5/2000 | Stemme et al. | |
| 6,134,972 A * | 10/2000 | Streckert | C23C 14/046 428/629 |
| 8,733,180 B1 | 5/2014 | England et al. | |
| 9,772,345 B2 * | 9/2017 | Golly | G01P 1/026 |
| 2009/0211371 A1 | 8/2009 | Lewis et al. | |

\* cited by examiner

*Primary Examiner* — Jewel V Dowtin
(74) *Attorney, Agent, or Firm* — Donald J. Ersler

(57) ABSTRACT

An fluid flow rate measuring device preferably includes an airfoil, a differential pressure sensor and a programmable electronic controller. The airfoil includes a leading edge, a first pressure chamber, a second pressure chamber, and a trailing edge. At least one first hole is formed through the first pressure chamber. At least one second hole is formed through the second pressure chamber adjacent the trailing edge. The at least one first hole communicates with the first pressure chamber. The at least one second hole communicates with the second pressure chamber. The first and second pressure chambers are connected to first and second input ports of the differential pressure sensor. The differential pressure sensor outputs a voltage to the programmable electronic controller. The programmable electronic controller takes a square root of the differential pressure and multiplies it by a K factor to produce an fluid flow rate in CFM.

20 Claims, 7 Drawing Sheets

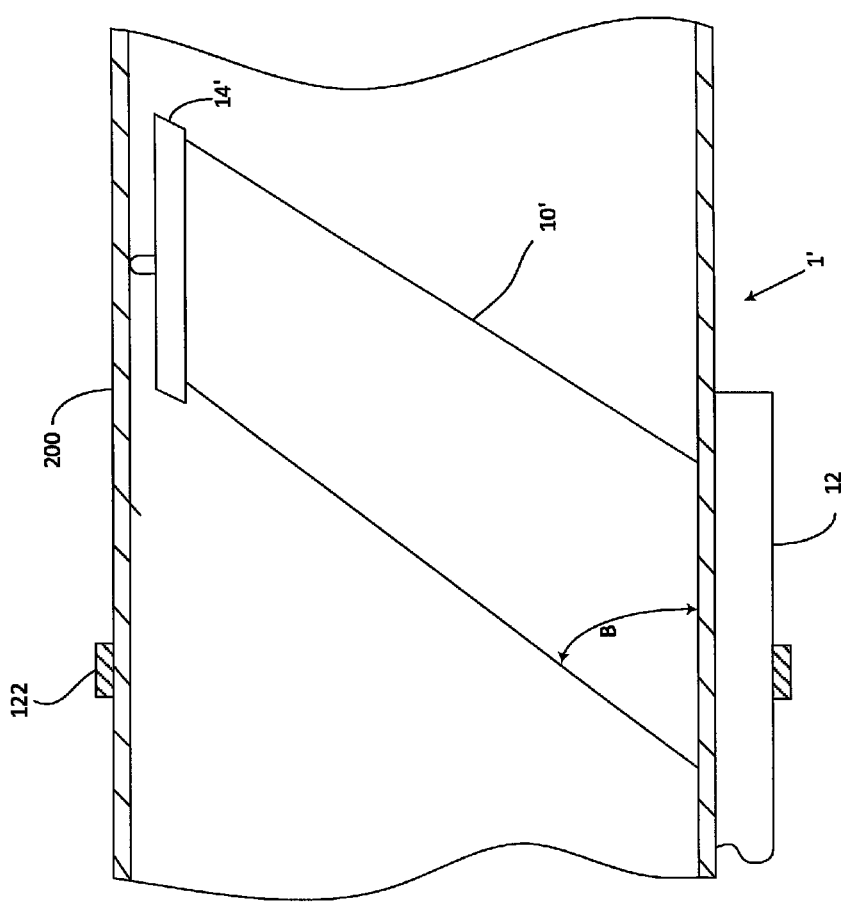

FLUID FLOW RATE MEASURING DEVICE

CROSS-REFERENCES TO RELATED APPLICATIONS

This is a utility patent application taking priority from provisional application No. 62/319,319 filed on Apr. 7, 2016.

BACKGROUND OF THE INVENTION

Field of the Invention

The present invention relates generally to fluid flow and more specifically to a fluid flow rate measuring device, which uses an airfoil to calculate a fluid flow rate in a conduit.

Discussion of the Prior Art

Patent publication no. 2009/0211371 to Lewis et al. discloses a flow measuring device. U.S. Pat. No. 6,055,869 to Stemme et al. discloses a lift force fluid flow sensor for measuring fluid flow velocities. U.S. Pat. No. 8,733,180 to England et al. discloses an airfoil-shaped fluid flow tool for use in making differential measurements.

Accordingly, there is a clearly felt need in the art for a fluid flow rate measuring device, which uses an airfoil and differential pressure to calculate a fluid flow rate in a conduit, such as a HVAC duct.

SUMMARY OF THE INVENTION

The present invention provides a fluid flow rate measuring device, which uses an airfoil to calculate an fluid flow rate inside a conduit, such as a HVAC duct. Inventors are defining a conduit as an open channel or enclosed tube for conveying a fluid. The fluid is defined as a gas, such as air, or a liquid, such as water. The fluid flow rate measuring device preferably includes an airfoil, an airfoil mounting plate, an inner end cap, a differential pressure sensor and a programmable electronic controller. The airfoil includes a leading edge, a substantially flat surface, a shaped surface, a chord and a trailing edge. The substantially flat surface defines a high pressure side of the airfoil. The shaped surface defines a low pressure side of the airfoil. A front of the substantially flat surface and the shaped surface meet to form the leading edge. A rear of the substantially flat surface and the shaped surface meet to form the trailing edge. A plurality of through cavities are formed through a width of the airfoil. The airfoil is preferably an aluminum extrusion, but other manufacturing methods or materials may also be used. A second embodiment of the airfoil includes a leading edge, a first substantially flat surface, a second substantially flat surface, a chord and a trailing edge.

A first through cavity includes a first trapezoidal cross section and a first round cross section. The first round cross section intersects a front of the first trapezoidal cross section. A second through cavity includes a substantially square cross section. The second through cavity is also a first pressure chamber. At least one first pressure hole is formed through the shaped surface to communicate with the first pressure chamber. A third through cavity includes a second trapezoidal cross section and a second round cross section. The second round cross section intersects a rear of the second trapezoidal cross section. A fourth through cavity includes a triangular cross section. The fourth through cavity is also a second pressure chamber. At least one second pressure hole is formed through the substantially flat surface to communicate with the second pressure chamber.

One end of the airfoil is sealed with an inner gasket and an inner end cap. The inner gasket includes a first chamber projection and a second chamber projection. The inner gasket seals one end of the first and second pressure chambers. The inner gasket is inserted between the end cap and airfoil. The end cap includes a peripheral wall. An inner perimeter of the peripheral wall is sized to receive an outer cross sectional perimeter of the airfoil. An opposing end of the airfoil is sealed with a gasket plate and an airfoil mounting plate. The gasket plate seals the opposing end of the airfoil including the first and second chambers. The airfoil mounting plate includes a first chamber nozzle and a second chamber nozzle. The first and second chamber nozzles extend from an outside surface of the airfoil mounting plate.

A first chamber projection extends from an inside surface of the airfoil mounting plate, concentric with the first chamber nozzle. A first through hole passes through the first chamber nozzle and chamber projection. A second chamber projection extends from an inside surface of the airfoil mounting plate, concentric with the second chamber nozzle. A second through hole passes through the second chamber nozzle and chamber projection. A differential pressure sensor is preferably attached to an outside surface of the airfoil mounting plate with a plurality of fasteners. The differential pressure sensor includes a first inlet and a second inlet. Differential pressure sensors are well known in the art and do not have to be explained in further detail. A first chamber tube connects the first chamber nozzle with the first inlet and a second chamber tube connects the second chamber nozzle to the second inlet. However, the inlets of the differential pressure sensor could be molded as an integral part of the airfoil mounting plate, thus making the first and second chamber tubes unnecessary. An electrical output of the differential pressure sensor is fed to the programmable electronic controller.

In use, an airfoil cutout is preferably formed through a side of a HVAC (heating, ventilation and air conditioning) duct. The airfoil cutout is sized to receive an outer perimeter of the airfoil and the end cap. An optional elastomeric support projection extends from an outside surface of the inner gasket. The support projection makes contact with an inside surface of a wall of the HVAC duct. The airfoil profile is cut in the HVAC duct, such that an acute angle is formed between a horizontal axis of the duct and the substantially flat surface of the airfoil. The acute angle has a preferably range of between 0-20 degrees from a horizontal axis of the HVAC duct. The airfoil of the fluid flow rate measuring device is inserted through the airfoil cutout and the support projection contacts the inside surface of a wall of the HVAC duct. A band clamp is cinched around the airfoil mounting plate and a perimeter of the duct to retain the fluid flow rate measuring device in place. When fluid flows around the fluid flow rate measuring device, the differential pressure sensor outputs a voltage, which is proportional to the differential pressure measurement across the airfoil. The differential pressure measurement is used to calculate velocity of fluid flow. The programmable electronic controller includes a voltage input port and a display output. The programmable electronic controller is programmed to calculate velocity and take a square root of the differential pressure as expressed by the voltage at the input port. The result of the square root calculation is multiplied by a K factor. The K factor is determined by a cross sectional area of the conduit. The product of the square root and K factor yield a measurement of volumetric fluid flow rate in CFM. The velocity or volumetric fluid flow rate is disclosed on a display device, such as a touch screen.

Accordingly, it is an object of the present invention to provide an fluid flow rate measuring device located in a conduit, which uses an airfoil and differential pressure to calculate the fluid flow rate inside the conduit.

These and additional objects, advantages, features and benefits of the present invention will become apparent from the following specification.

BRIEF DESCRIPTION OF THE DRAWINGS

FIG. 9 is a top cross sectional view of an alternative embodiment of a fluid flow rate measuring device retained in a HVAC duct in accordance with the present invention.

DETAILED DESCRIPTION OF THE PREFERRED EMBODIMENTS

Figure 1:
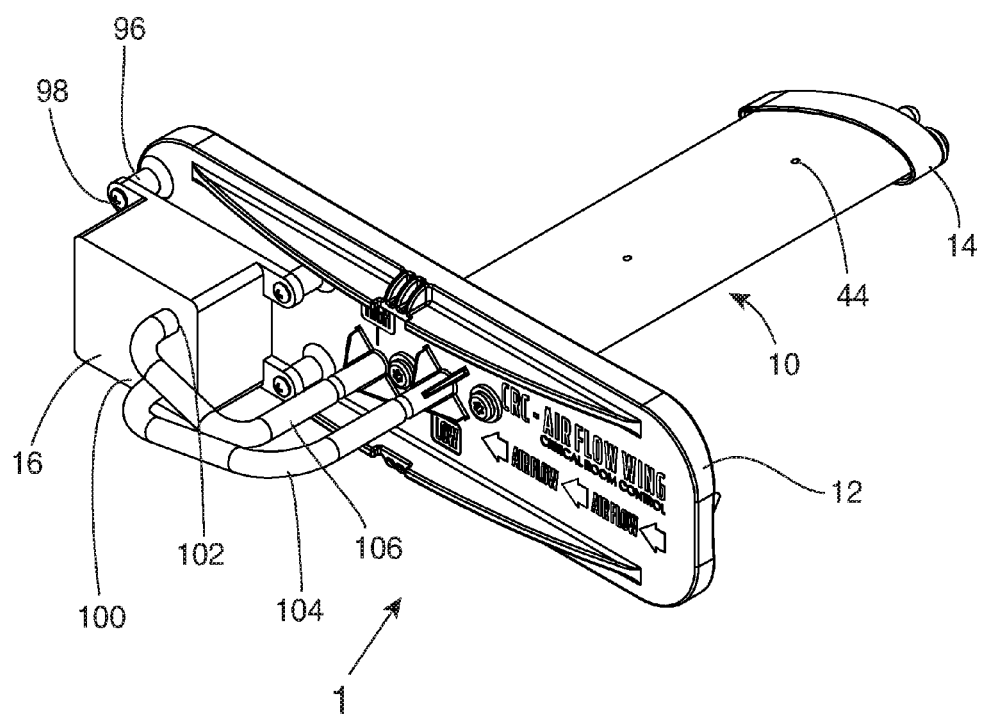
FIG. 1 is a perspective view of a fluid flow rate measuring device in accordance with the present invention.
Figure 2:
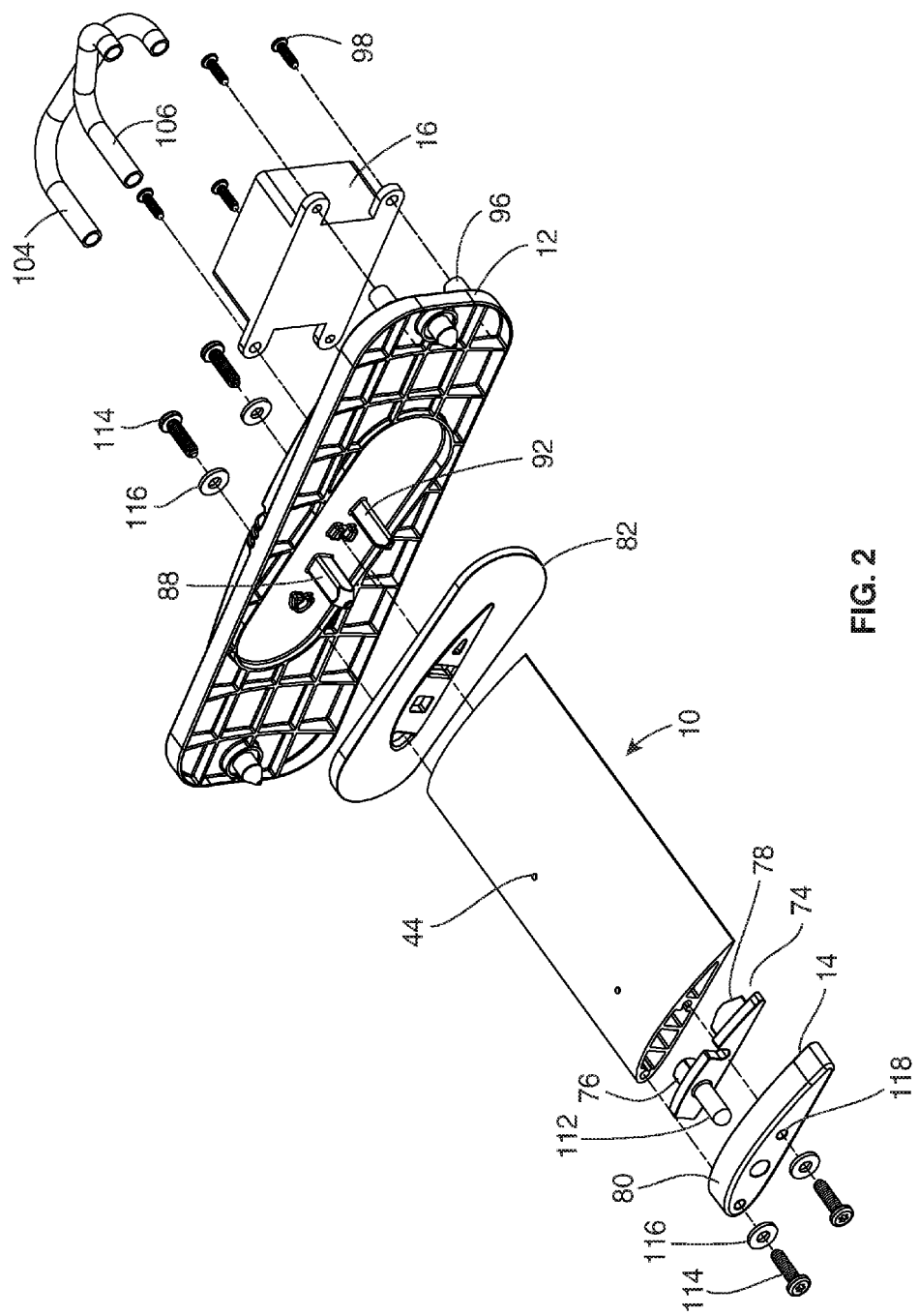
FIG. 2 is an exploded reverse perspective view of a fluid flow rate measuring device in accordance with the present invention.
Figure 3:
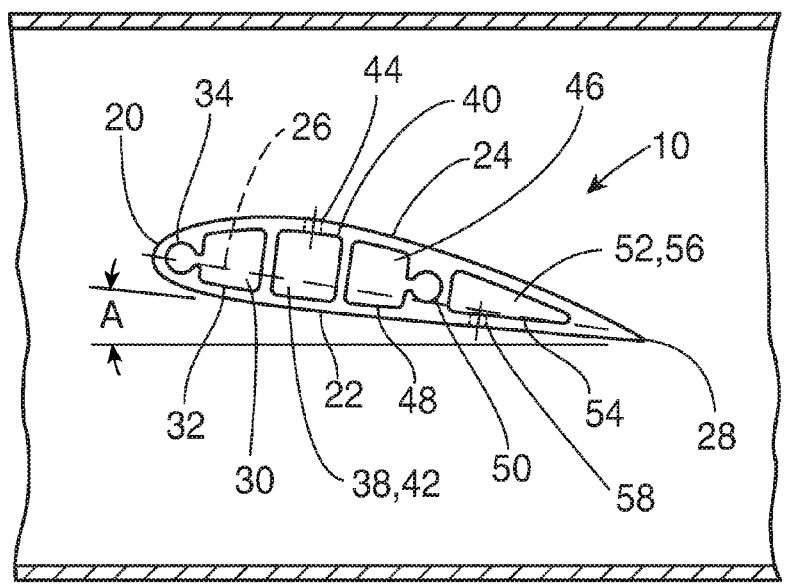
FIG. 3 is a side cross sectional view of an airfoil located in a duct of a fluid flow rate measuring device in accordance with the present invention.
Figure 6:
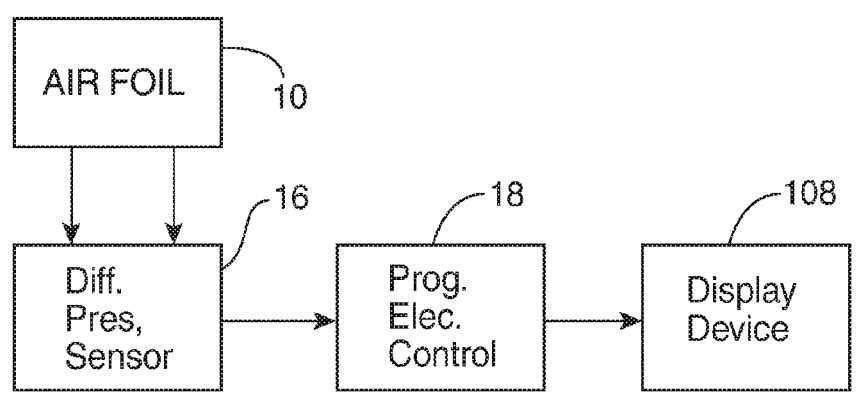
FIG. 6 is a schematic diagram of a fluid flow rate measuring device in accordance with the present invention.

With reference now to the drawings, and particularly to FIG. 1, there is shown a perspective view of a fluid flow rate measuring device 1. With reference to FIGS. 2 and 6, the fluid flow rate measuring device 1 preferably includes an airfoil 10, a airfoil mounting plate 12, an inner end cap 14, a differential pressure sensor 16 and a programmable electronic controller 18. With reference to FIG. 3, the airfoil 10 includes a leading edge 20, a substantially flat surface 22, a shaped surface 24, a chord 26 and a trailing edge 28. The substantially flat surface 22 defines a high pressure side of the airfoil 10. The shaped surface 24 defines a low pressure side of the airfoil 10. A front of the substantially flat surface 22 and the shaped surface 24 meet to form the leading edge 20. A rear of the substantially flat surface 22 and the shaped surface 24 meet to form the trailing edge 28. A plurality of cavities are formed through a width of the airfoil. The airfoil 10 is preferably an aluminum extrusion, but other manufacturing methods or materials may also be used.

A first through cavity 30 includes a first trapezoidal cross section 32 and a first round cross section 34. The first round cross section 34 intersects a front of the first trapezoidal cross section 32. A second through cavity 38 includes a substantially square cross section 40. The second through cavity 38 is also a first (or low) pressure chamber 42. At least one first pressure hole 44 is formed through the shaped surface 24 to communicate with the first pressure chamber 42. A third through cavity 46 includes a second trapezoidal cross section 48 and a second round cross section 50. The second round cross section 50 intersects a rear of the second trapezoidal cross section 48. A fourth through cavity 52 includes a triangular cross section 54. The fourth through cavity 52 is also a second (or high) pressure chamber 56. At least one second pressure hole 58 is formed through the substantially flat surface 22 to communicate with the second pressure chamber 54. If the first and second pressure holes 44, 58 are formed in a middle of the airfoil 10, the velocity at the middle of a conduit will be measured. If a plurality of first and second pressure holes 44, 58 are formed along a length of the airfoil 10, an average velocity across the conduit will be measured.

Figure 4:
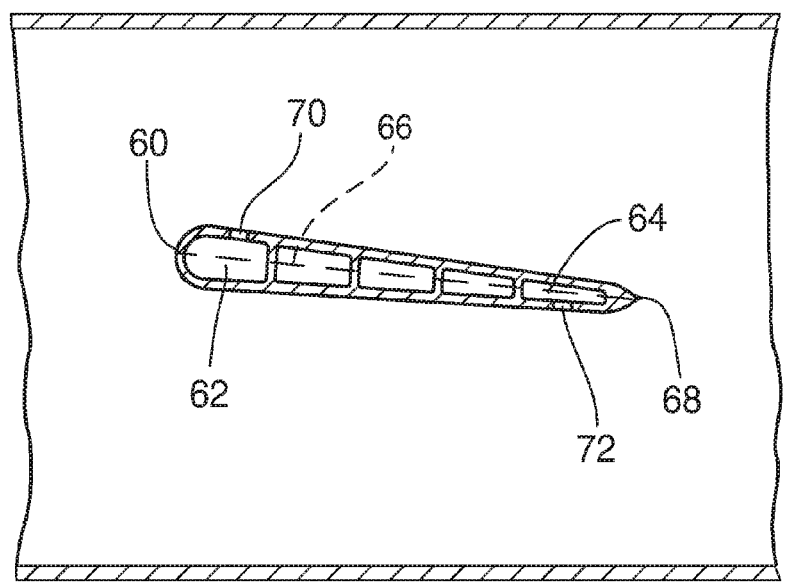
FIG. 4 is a side cross sectional view of a symmetric airfoil located in a duct of a fluid flow rate measuring device in accordance with the present invention.

With reference to FIG. 4, a symmetric airfoil 11 preferably includes a leading edge 60, a first pressure chamber 62, a second pressure chamber 64, a chord 66 and a trailing edge 68. The airfoil 11 is preferably created from an aluminum extrusion having a plurality of inner cavities. At least one first hole 70 is formed through the first chamber 62 or first cavity, adjacent the leading edge 60. At least one second hole 72 is formed through the second chamber 64 or a fifth cavity, adjacent the trailing edge 68. The at least one first hole 70 communicates with the first pressure chamber cavity 62. The at least one second hole 72 communicates with the second pressure chamber 64. Each end of the first pressure chamber 62 is sealed and each end of the second pressure chamber 64 is sealed. The airfoil 10 could be replaced with the airfoil 11.

Figure 5:
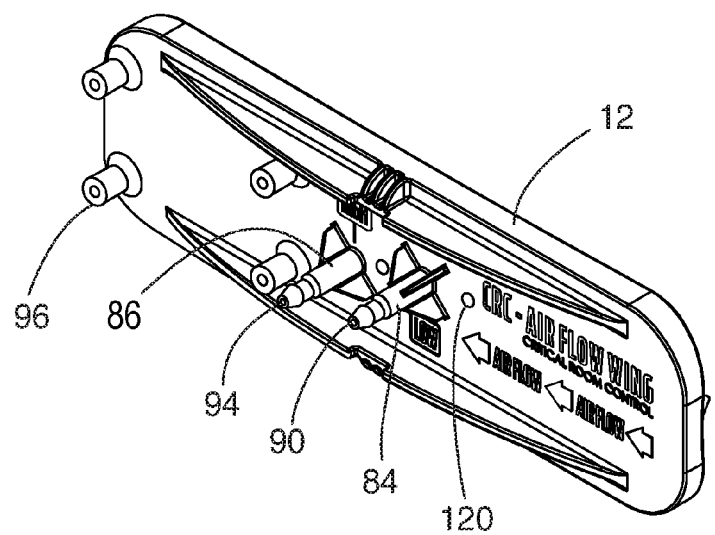
FIG. 5 is a front perspective view of an airfoil mounting plate of a fluid flow rate measuring device in accordance with the present invention.

One end of the airfoil 10 is sealed with an inner gasket 74 and an inner end cap 14. The inner gasket 74 includes a first chamber projection 76 and a second chamber projection 78 extending from one side of thereof. The first and second chamber projections 76, 78 are sized to be inserted into the first and second pressure chambers 42, 56. The inner gasket 74 seals one end of the first and second pressure chambers 42, 56. The inner gasket 74 is inserted between the inner end cap 14 and the airfoil 10. The end cap 14 includes a peripheral wall 80. An inner perimeter of the peripheral wall 80 is sized to receive an outer perimeter of a cross section of the airfoil 10. An opposing end of the airfoil 10 is sealed with the gasket plate 82 and the airfoil mounting plate 12. The gasket plate 82 seals the opposing end of the airfoil 10 including the first and second chambers. With reference to FIG. 5, the airfoil mounting plate 12 includes a first chamber nozzle 84 and a second chamber nozzle 86. The first and second chamber nozzles 84, 86 extend from an outside surface of the airfoil mounting plate 12.

A first chamber projection 88 extends from an inside surface of the airfoil mounting plate 12, concentric with the first chamber nozzle 84. A first through hole 90 passes through the first chamber nozzle 84 and the first chamber projection 88. An outer surface of the first chamber plug 88 is sized to be received by an inner perimeter of the first pressure chamber 42. A second chamber insert 92 extends from an inside surface of the airfoil mounting plate 12, concentric with the second chamber nozzle 86. A second through hole 94 passes through the second chamber nozzle 86 and the second chamber plug 92. An outer surface of the second chamber plug 92 is sized to be received by an inner perimeter of the second pressure chamber 56. The differential pressure sensor 16 is preferably attached to a plurality of sensor projections 96 extending from an outside surface of the airfoil mounting plate 12 with at least one fastener 98. The differential pressure sensor 16 includes a first inlet 100 and a second inlet 102. Differential pressure sensors are well known in the art and need not be explained in further detail. A first chamber tube 104 connects the first chamber nozzle 84 with the first inlet 100, and a second chamber tube 106 connects the second chamber nozzle 86 to the second inlet 102. However, the inlets 100, 102 of the differential pressure sensor 16 could be molded as an integral part of the airfoil mounting plate 12, thus making the first and second chamber tubes unnecessary. With reference to FIG. 6, an electrical output of the differential pressure sensor 16 is fed to the programmable electronic controller 18 and shown on a display device 108.

Figure 7:
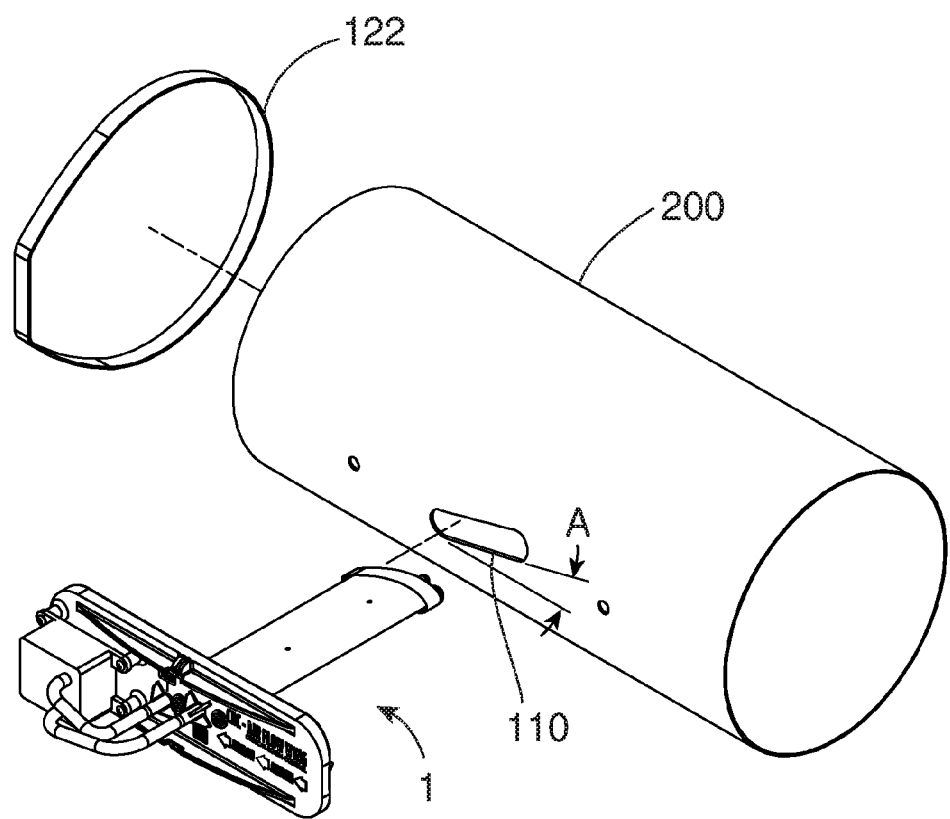
FIG. 7 is an exploded perspective view of an fluid flow rate measuring device, a HVAC duct and a band clamp in accordance with the present invention.
Figure 8:
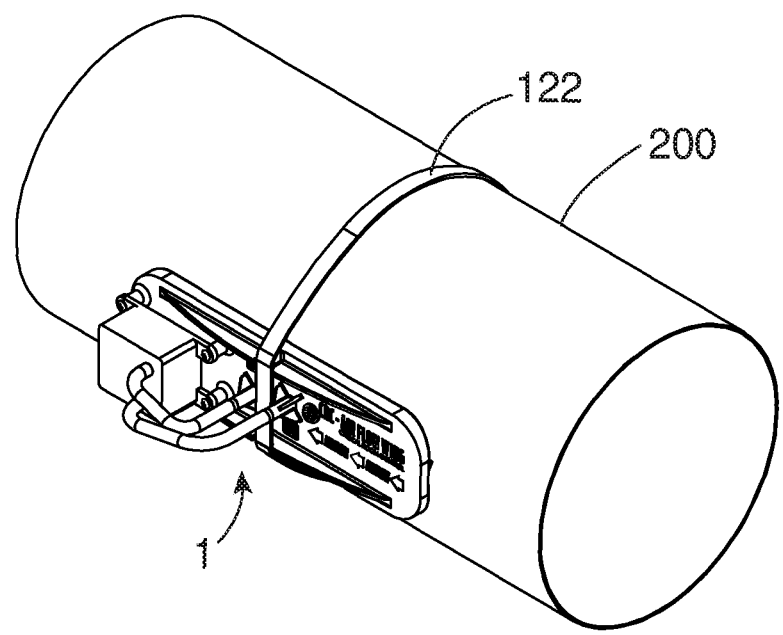
FIG. 8 is a perspective view of a fluid flow rate measuring device secured to a HVAC duct with a band clamp in accordance with the present invention.

With reference to FIGS. 7-8, an airfoil cutout 110 is preferably formed through a sidewall of a HVAC duct 200. The airfoil cutout 110 is sized to receive an outer cross sectional perimeter of the airfoil 10 and the end cap 74. An optional elastomeric support projection 112 extends from an outside surface of the inner gasket 74. The support projection 112 makes contact with an inside surface of a sidewall of the HVAC duct 200 to minimize vibration of the fluid flow rate measuring device 1 relative to the HVAC duct 200. The inner end cap 14 and the inner gasket 74 are secured to the one end of the airfoil 10 by forming two tapped holes in the first and second round cross sections 34, 50; applying two washers 116 to two fasteners 114; inserting the two fasteners 114 through two fastener holes 118 in the inner end cap 14; and tightening the two fasteners 114 in the two tapped holes. The tightened two fasteners 114 cause the inner gasket 74 to seal the first and second chambers 42, 56. However, the tapped holes will not be necessary if self-tapping fasteners are used.

The airfoil mounting plate 12 and the gasket plate 82 are secured to the opposing end of the airfoil 10 by forming tapped holes in the first and second round cross sections 34, 50; applying the two washers 116 to the two fasteners 114; inserting the two fasteners 114 through the two fastener holes 120 in the airfoil mounting plate 12; and tightening the two fasteners 114 in the two tapped holes. The tightened two fasteners 114 cause the gasket plate 82 to seal the first and second chambers 42, 56. However, the tapped holes will not be necessary if self-tapping fasteners are used. The airfoils 10, 11 are retained within an inner perimeter of the HVAC duct 200, a width of the airfoil 10, 11 is preferably located adjacent a lengthwise axis of the HVAC duct 200.

The airfoil cutout 110 is formed through a sidewall of the duct 200, such that an acute angle "A" is formed between a horizontal axis of the duct 200 and the substantially flat surface 22 of the airfoil 10. The acute angle "A" has a preferably range of between 0-20 degrees from a horizontal axis of the HVAC duct. However, the acute angle "A" may have other values that are greater than 20 degrees. The airfoil 10 of the fluid flow rate measuring device is inserted through the airfoil cutout 110 and the elastomeric support projection 112 contacts the inside surface of a wall of the HVAC duct 200. A band clamp 122 is cinched around the airfoil mounting plate 12 and a perimeter of the HVAC duct 200 to retain the fluid flow rate measuring device 1 in place. When fluid flows around the airfoil 10, the differential pressure sensor 16 outputs a voltage, which is proportional to a differential pressure measurement across the airfoil 10. The programmable electronic controller 18 includes a voltage input port and a display output. The programmable electronic controller 16 is programmed to calculate velocity and take a square root of the differential pressure as expressed by the voltage at an input port. The result of the square root calculation is multiplied by a K factor. The K factor is determined by a cross sectional size of the duct 200. The product of the square root and K factor yield a measurement of volumetric fluid flow rate in CFM. The velocity or volumetric fluid flow rate is disclosed on a display device 108, such as a touch screen.

With reference to FIG. 9, an alternative embodiment of a fluid flow rate measuring device 1' is retained in the HVAC duct 200. An airfoil 10' extends from the airfoil mounting plate 12 at an acute angle "B." Normally, the airfoil 10 is perpendicular relative to the airfoil mounting plate 12 or a sidewall of the HVAC duct 200.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A fluid flow rate measuring device comprising:
an airfoil includes a leading edge, a substantially flat surface, a shaped surface, a trailing edge and a plurality of through cavities formed through a length thereof, a first pressure chamber is formed in one of said plurality of through cavities, a second pressure chamber is formed in another one of said plurality of through cavities, at least one first pressure hole is formed through said shaped surface into said first pressure chamber, at least one second pressure hole is formed through said substantially flat surface into said second pressure chamber, wherein said airfoil is retained in a fluid stream, a difference between a pressure in said first pressure chamber and said second pressure chamber is used to calculate at least one of a velocity and a volumetric fluid flow rate of the fluid stream.

2. The fluid flow rate measuring device of claim 1, further comprising:
said airfoil is retained within an inner perimeter of a conduit, a difference between a pressure in said first pressure chamber and said second pressure chamber is used to calculate at least one of a velocity and a volumetric fluid flow rate of the fluid stream.

3. The fluid flow rate measuring device of claim 2 wherein:
the conduit is a HVAC duct.

4. The fluid flow rate measuring device of claim 1, further comprising:
a differential pressure sensor includes a first input port, a second input port and a voltage output, said differential pressure sensor calculates a pressure difference between said first and second pressure chambers, said differential pressure sensor outputs a voltage proportional to the pressure difference.

5. The fluid flow rate measuring device of claim 4, further comprising:
an electronic programmable controller includes a voltage input port and a display output, said programmable electronic controller is programmed to take a square root of the pressure difference, the pressure difference is multiplied by a K factor to provide at least one the velocity and the volumetric fluid flow rate of the fluid stream.

6. The fluid flow rate measuring device of claim 5 wherein:
said K factor is derived from a cross sectional area of a flow stream.

7. The fluid flow rate measuring device of claim 5, further comprising:

a display device receives a signal from said display output and displays at least one of the velocity and the volumetric fluid flow rate of the fluid stream.

8. The fluid flow rate measuring device of claim 1 wherein:
a length of said airfoil extends from a sidewall of the conduit at an acute angle.

9. A fluid flow rate measuring device comprising:
an airfoil includes a leading edge, a substantially flat surface, a shaped surface, a trailing edge and a plurality of through cavities formed through a length thereof, a first pressure chamber is formed in one of said plurality of through cavities, a second pressure chamber is formed in another one of said plurality of through cavities, at least one first pressure hole is formed through said shaped surface into said first pressure chamber, at least one second pressure hole is formed through said substantially flat surface into said second pressure chamber, wherein said airfoil is retained in a fluid stream, said substantially flat surface is oriented at an acute angle of 0-45 degrees relative to a horizontal axis, a difference between a pressure in said first pressure chamber and said second pressure chamber is used to calculate at least one of a velocity and a volumetric fluid flow rate of the fluid stream.

10. The fluid flow rate measuring device of claim 9, further comprising:
said airfoil is retained within an inner perimeter of a conduit, said airfoil is located adjacent a lengthwise axis of the conduit, a difference between a pressure in said first pressure chamber and said second pressure chamber is used to calculate at least one of the velocity and the volumetric fluid flow rate of the fluid stream.

11. The fluid flow rate measuring device of claim 10 wherein:
the conduit is a HVAC duct.

12. The fluid flow rate measuring device of claim 9, further comprising:
a differential pressure sensor includes a first input port, a second input port and a voltage output, said differential pressure sensor calculates a pressure difference between said first and second pressure chambers, said differential pressure sensor outputs a voltage proportional to the pressure difference.

13. The fluid flow rate measuring device of claim 12, further comprising:
an electronic programmable controller includes a voltage input port and a display output, said programmable electronic controller is programmed to take a square root of the pressure difference, the pressure difference is multiplied by a K factor to provide at least one the velocity and the volumetric fluid flow rate of the fluid stream.

14. The fluid flow rate measuring device of claim 13 wherein:
said K factor is derived from a cross sectional area of a flow stream.

15. A fluid flow rate measuring device comprising:
an airfoil includes a leading edge, a substantially flat surface, a shaped surface, a trailing edge and a plurality of through cavities formed through a length thereof, a first pressure chamber is formed in one of said plurality of through cavities, a second pressure chamber is formed in another one of said plurality of through cavities, at least one first pressure hole is formed through said shaped surface into said first pressure chamber, at least one second pressure hole is formed through said substantially flat surface into said second pressure chamber, wherein said airfoil is retained in a fluid stream, said substantially flat surface is positioned at a bottom of said airfoil, a difference between a pressure in said first pressure chamber and said second pressure chamber is used to calculate a velocity of the fluid stream.

16. The fluid flow rate measuring device of claim 15, further comprising:
said airfoil is retained within an inner perimeter of a conduit, said airfoil is located adjacent a lengthwise axis of the conduit, a difference between a pressure in said first pressure chamber and said second pressure chamber is used to calculate at least one of the velocity and the volumetric fluid flow rate of the fluid stream.

17. The fluid flow rate measuring device of claim 16 wherein:
the conduit is a HVAC duct.

18. The fluid flow rate measuring device of claim 15, further comprising:
a differential pressure sensor includes a first input port, a second input port and a voltage output, said differential pressure sensor calculates a pressure difference between said first and second pressure chambers, said differential pressure sensor outputs a voltage proportional to the pressure difference.

19. The fluid flow rate measuring device of claim 18, further comprising:
an electronic programmable controller includes a voltage input port and a display output, said programmable electronic controller is programmed to take a square root of the pressure difference, the pressure difference is multiplied by a K factor to provide at least one the velocity and the volumetric fluid flow rate of the fluid stream.

20. The fluid flow rate measuring device of claim 19 wherein:
said K factor is derived from a cross sectional area of a flow stream.

* * * * *